United States Patent
Williams

(10) Patent No.: US 8,665,334 B2
(45) Date of Patent: Mar. 4, 2014

(54) BLUR-CALIBRATION SYSTEM FOR ELECTRO-OPTICAL SENSORS AND METHOD USING A MOVING MULTI-TARGET CONSTELLATION

(75) Inventor: Darin Williams, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 85 days.

(21) Appl. No.: 13/214,683

(22) Filed: Aug. 22, 2011

(65) Prior Publication Data

US 2013/0050505 A1    Feb. 28, 2013

(51) Int. Cl.
*H04N 17/00* (2006.01)
*H04N 17/02* (2006.01)

(52) U.S. Cl.
USPC .......................................... 348/188; 348/187

(58) Field of Classification Search
USPC ................. 348/187, 188; 382/255; 702/104
See application file for complete search history.

(56) References Cited

U.S. PATENT DOCUMENTS

| | | | |
|---|---|---|---|
| 5,696,848 A * | 12/1997 | Patti et al. | 382/254 |
| 6,285,799 B1 * | 9/2001 | Dance et al. | 382/261 |
| 7,463,753 B2 | 12/2008 | Williams et al. | |
| 7,881,495 B2 | 2/2011 | Williams et al. | |
| 7,899,271 B1 | 3/2011 | Williams | |
| 7,920,982 B2 | 4/2011 | Williams | |
| 2004/0214342 A1 * | 10/2004 | Armstrong et al. | 436/172 |
| 2009/0299674 A1 * | 12/2009 | Williams et al. | 702/104 |
| 2010/0183235 A1 * | 7/2010 | Chen et al. | 382/255 |

FOREIGN PATENT DOCUMENTS

WO    WO-2013028758 A1    2/2013

OTHER PUBLICATIONS

"International Application Serial No. PCT/US2012/051863, Search Report mailed Nov. 16, 2012", 3 pgs.
"International Application Serial No. PCT/US2012/051863, Written Opinion mailed Nov. 16, 2012", 6 pgs.

* cited by examiner

*Primary Examiner* — Michael Lee
(74) *Attorney, Agent, or Firm* — Schwegman, Lundberg & Woessner, P.A.

(57) ABSTRACT

Embodiments of a system and method for blur-calibration of an imaging sensor using a moving constellation are generally described herein. In some embodiments, blur-calibration of an imaging sensor includes moving a known target pattern across the field-of view (FOV) of the imaging sensor to present the target pattern across different frames at different pixel phases. Frames of images of the moving target pattern as seen in the FOV of the imaging sensor are captured to generate image data output. The image data output may be subsequently processed to generate data products representative of a shape of a point-spread function (PSF) from a high-resolution composite image generated from the captured frames. A chopper modulation may be applied to the moving target sequence and separate chopper-open and chopper-closed composite images are created. The PSF may be determined based on the difference between the chopper-open and chopper-closed composite images. The PSF may specify the shape of blur at one or more locations in the FOV.

14 Claims, 2 Drawing Sheets

BLUR-CALIBRATION SYSTEM FOR ELECTRO-OPTICAL SENSORS AND METHOD USING A MOVING MULTI-TARGET CONSTELLATION

GOVERNMENT RIGHTS

This invention was made with United States Government support under Contract Number HQ0276-08-C-0001 with the Department of Defense. The United States Government has certain rights in this invention.

RELATED APPLICATION

This patent application is related to United States patent application entitled "OPTICAL DISTORTION CALIBRATION FOR ELECTRO-OPTICAL SENSORS", Ser. No. 13/021,729, filed Feb. 5, 2011, the entire contents of which is incorporated by reference.

TECHNICAL FIELD

Some embodiments pertain to imaging systems. Some embodiments pertain to blur-calibration of imaging sensors including electro-optical sensors. Some embodiments pertain to space-astronomy systems. Some embodiments pertain to kill vehicles and space systems.

BACKGROUND

One problem with imaging systems is the amount of image blur that is attributable to their optics and other components. Some applications require precision measurement of the system point-spread function (PSF) of the imaging system to be made in-situ. This is extraordinarily difficult as it may require measuring an unresolved (near point) source at a resolution that is far higher than the pixel resolution. In some cases, it may also be necessary to measure the change in the PSF across the field-of-view (FOV) of an imaging sensor, compounding the blur-calibration problem.

This blur-calibration problem is markedly more difficult in systems where the required precision or other conditions, such as operation in cryo-vacuum conditions, make it impractical to project precision collimated patterns that fill the sensor's entire FOV. Conventional approaches used to blur-calibrate electro-optic sensors in a cryo-vacuum chamber are time-consuming, expensive and limited in accuracy.

Thus there are general needs for systems and methods for improved blur-calibration of imaging sensors which reduce the cost and the calibration time and which increase the accuracy of the blur-calibration data. What are also needed are systems and methods for blur-calibration of imaging sensors suitable for use in cryo-vacuum conditions.

SUMMARY

Embodiments of a blur-calibration system for electro-optical sensors and method using a moving multi-target constellation are generally described herein. In some embodiments, blur-calibration of an imaging sensor includes moving a known target pattern across the FOV of the imaging sensor to present the target pattern across different frames at different pixel phases and capturing frames of images of the moving target pattern as seen in the FOV of the imaging sensor to generate image data output. The image data output may be subsequently processed to generate data products representative of a shape of a point-spread function (PSF) from a high-resolution composite image generated from the captured frames.

In some embodiments, a chopper modulation is applied to the moving target sequence and separate chopper-open and chopper-closed composite images are created. The PSF may be determined based on the difference between the chopper-open and chopper-closed composite images. The PSF may specify the shape of blur at one or more locations in the FOV.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
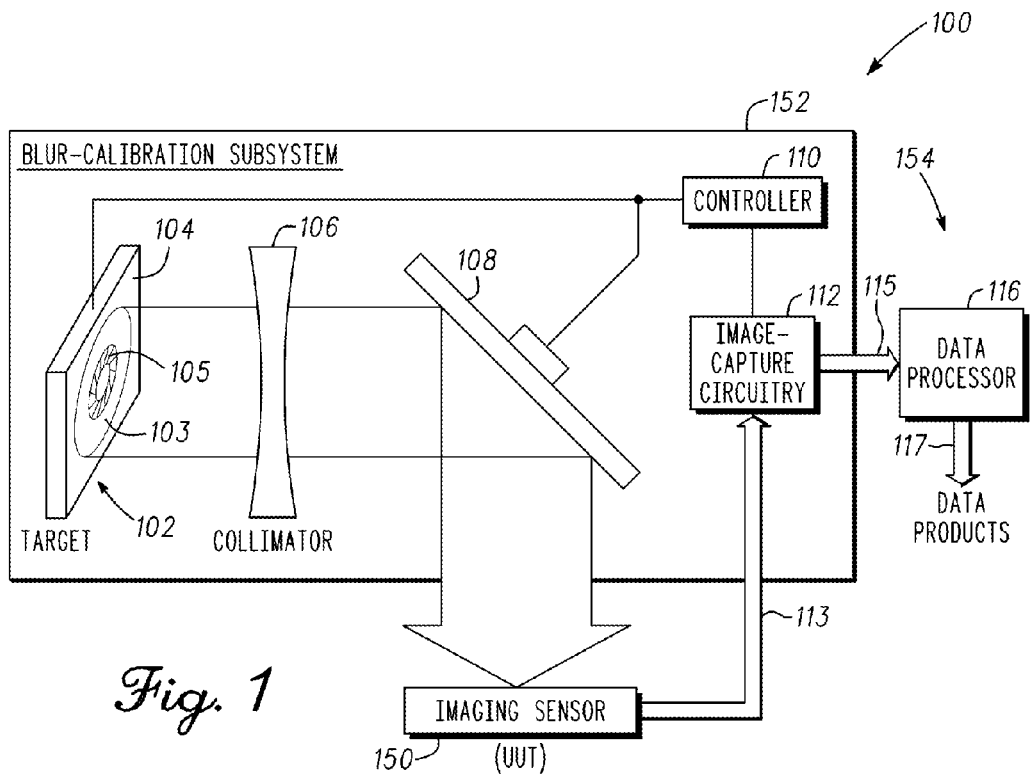
FIG. 1 illustrates a system for blur-calibration of an imaging sensor in accordance with some embodiments.

FIG. 1 illustrates a system for blur-calibration of an imaging sensor in accordance with some embodiments. System 100 may be configured for performing optical blur-calibration for an electro-optical sensor, such as imaging sensor 150. The system 100 may include a blur-calibration subsystem 152 to capture image data from the imaging sensor 150 and a data processing subsystem 154 to process the image data output 115 from the blur-calibration subsystem 152 to generate blur-calibration data for the imaging sensor 150 (i.e., the unit under test (OUT)).

The blur-calibration subsystem 152 includes at least a target 102, a projection element 106, a controller 110, and image-capture elements 112. The target 102 may have a known target pattern 104 that comprises a constellation of point-like objects 103 with fixed relative positions. The projection element 106 may be configured to project at least a portion of the target pattern 104 within the FOV of the imaging sensor 150. The controller 110 may be configured to move the target pattern 104 across the FOV. The image-capture elements 112 may be configured to capture frames of images 113 of the moving target pattern 104 (i.e., frames of video) as seen in the FOV of the imaging sensor 150 and generate an image data output 115. The controller 110 may be configured to cause the target pattern 104 to move across the FOV to present the target pattern 104 across different frames on different pixels and at different pixel phases.

The image data output 115 from the image-capture elements 112 may be subsequently processed by a data processing element 116 to generate data products 117 representative of a shape of a point-spread function (PSF) from a high-resolution composite image generated from the captured frames. The data processing element 116 may be a data processing system or a computer system configured to process the image data output 115 from the image-capture elements 112 as described in more detail below. In some embodiments, the data processing element 116 may be configured with software to process the image data output 115 generated from the image-capture elements 112.

In some embodiments, the image-capture elements 112 may comprise digital circuitry (CCDs) configured to image capture and image storage. In other the image-capture elements 112 may comprise an analog media such as film or magnetic media suitable for image capture and image storage.

The system 100 allows for blur-calibration of the imaging sensor 150 while the target 102 is in motion across the FOV thus providing a more efficient and accurate blur-calibration process. In accordance with some embodiments, the system 100 may be configured for performing optical blur-calibration for an imaging sensor 150 in a chamber, such as a cryo-vacuum chamber.

In some embodiments, the data processing element 116 may be configured to determine an overall shift of the target pattern 104 across the FOV in each frame of video of the image data output 115. The point-like objects observed in each frame of video of the image data output 115 may be associated with corresponding point-like objects 103 of the target pattern 104 (since the target patter 104 is a known target pattern). One or more sub-pixel resolution composite images may be generated for one or more of the point-like objects 103 by combing different images of same point-like objects taken at the different pixel phases. Each sub-pixel resolution composite image may be effectively placed within the high-resolution composite image according to its relative position, including its sub-pixel phase, of the point-like object 103 in that image. In these embodiments, the data processing element 116 may be configured to produce data products 117 representative of a shape of the PSF from the composite image. The shape of the PSF represents the blur. The data products 117 that are produced are blur-calibration data for end-item use of the imaging sensor 150. The blur-calibration data may eliminate blur at one or more places in the FOV.

In some embodiments, the images of same point-like objects 103 are applied to (i.e., placed within) the composite image at the relative position of the object in that image (i.e., relative to the other images) to generate the composite images. In some embodiments, the system 100 may also be configured to utilize a neighborhood of samples to provide error reduction in the high-resolution composite image to create an approximation of a PSF for each point-like object. The use of the neighborhood of samples provides for noise reduction in the high-resolution composite image, as well as error reduction (i.e., slope times the registration error) in the composite image.

In some embodiments, multiple images of different point-like objects 103 of the same or different sizes may be included. In these embodiments, the relative offset of the objects may be known or may be calculated as a fit parameter. In these embodiments, each multiple image of each point-like object may be recorded.

The different pixel phases are different sub-pixel fractional positions of the point-like objects within each frame. The use of different sub-pixel fractional positions allows light to hit the pixels at different phases when scanned across the array. The combining of results from different pixels and source spots provides for high-collective phase diversity, effectively increasing the spatial sampling of e the image sequence to far beyond the cameras native pixel-spacing resolution. In these embodiments, gains and offsets may be calculated as the target pattern 104 is scanned across different frames so that different pixels observe the same area of the target pattern 104.

In some embodiments, the blur-calibration system 152 may also include one or more mirrors, such as mirror 108. In these embodiments, the controller 110 may be configured to move the target pattern 104 across the FOV by controlling and tilting one or more of the mirrors. In some embodiments, the controller 110 may be configured to move the target pattern 104 across the FOV by controlling movement of the imaging sensor 150, rather than by controlling mirrors. In other embodiments, the target 102 itself may be controlled to cause the target pattern 104 across the FOV.

In some embodiments, the projection element 106 may comprise a collimator to collimate light rays to project at least a portion the target pattern 104 within the FOV of the imaging sensor 150. In these embodiments, the collimated light rays make it appear as if the target 102 is at or near infinity. In general, only a portion of the target pattern 104 may be projected with the FOV of the imaging sensor 150, as there is no requirement that the entire target pattern 104 stay within the FOV.

In some embodiments, the data products 117 that are produced by data processing element 116 may be blur-calibration data for end-item use of the imaging sensor 150. The blur-calibration data may specify the shape of the blur at one or more places in the FOV. In some cases the effects of the size of the initial pinhole, relative to an idea point source, may be removed from the measures surface via de-convolution, often accomplished via a parametric fit to the remaining parameters. In some embodiments, the blur-calibration data may specify the shape of the blur at every location in the FOV. In general, the blur-calibration data may be manipulated to describe the PSF at some pre-determined location vs. where the actual point was sampled in test. In cases where the PSF is substantially constant across the FOV, this may not be necessary. In these embodiments, the blur-calibration data may be generated from a single data set (i.e., the image data output 115).

Figure 2:
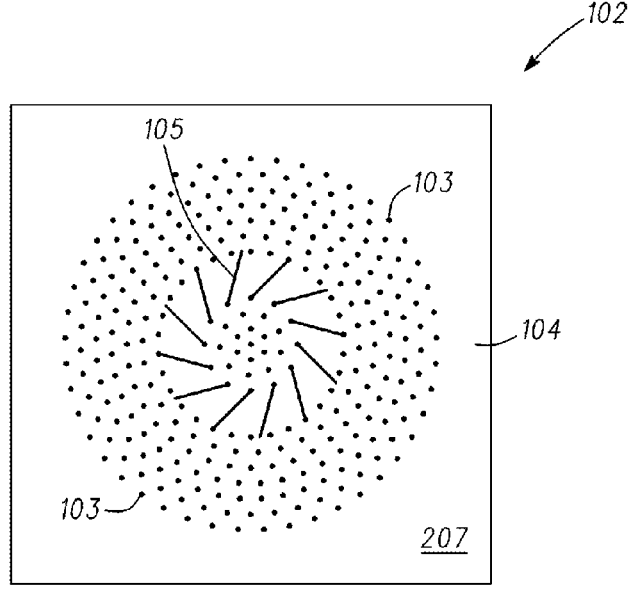
FIG. 2 is a target for use in blur-calibration of an imaging sensor accordance with some embodiments.

FIG. 2 is a target for use in blur-calibration of an imaging sensor accordance with some embodiments. Target 102 may correspond to target 102 (FIG. 1) and may have a known target pattern 104 that may comprise a plurality of point-like objects 103 with fixed relative positions. In some embodiments, the point-like objects 103 may comprise individual point sources of light that may be generated using a slide 207 with pinholes arranged in the target pattern 104 (e.g., a grid) and an infrared (IR) or visible light source behind the slide. The example embodiment shown in FIG. 2 uses a black body as a light source. In other embodiments, the light source may be a coherent.

In some embodiments, the target pattern 104 may be an asymmetric pattern configured to allow an overall position to be determined from a sufficiently large sub-area of the pattern 104. In these embodiments, the target pattern 104 may comprise a plurality of unique sub-patterns.

In some embodiments, the point-like objects 103 of the target pattern 104 may comprise irregularly spaced points having a wider spacing near a center of the pattern 104 and a closer spacing further away from the center for increased phase diversity and coverage, although this is not a requirement.

In some embodiments, the target pattern 104 may comprise a number of slits 105 for increased phase diversity. The slits may be arranged in a circle and may be tilted or angled for increased coverage for horizontal and vertical scans as well as for improved conductive thermal transfer of radiative heat absorbed by the middle of the slide. In some embodiments, the target pattern 104 may comprise a prime number of slits 105, although this is not a requirement. In these embodiments, the slits 105 may provide resolved phase-diverse references to make it easier to accurately measure sub-pixel positions.

In some embodiments, the target pattern 104 may comprise hexagonal rings of the point-like objects 103. In some of these embodiments, the radius to each point may decrease linearly with the distance from the center. The use of hexagonal rings of the point-like objects 103 may help in associating the point-like objects 103 observed in each frame with corresponding point-like objects of the known target pattern 104.

In some embodiments, a chopper modulation may be applied to the target pattern 104 to modulate intensities of the point-like objects 103 as the target pattern 104 is moved across the FOV. The chopper modulation may comprise an on-off modulation in which the intensities of the point-like objects are turned on and off, although this is not a requirement. A chopper modulation may be used suppress the background of the slide 207 (i.e., portion of the target without the point-like objects). The use of chopper modulation may be needed because the background 207 is never perfectly zero or flat. In some embodiments, the controller 110 may control the application of a chopper modulation at the target 102.

In some embodiments, the system 100 may be configured to generate composite images of the moving target pattern by separately generating chopper-open and chopper-closed composite images from chopper-modulated frames of video to allow removal of a non-uniform slide background. The high-resolution composite images of the chopper-open may be aligned with chopper closed modulated frames. The aligned frames may be subtracted from each other to remove the effect of the slide background and capture the actual PSF. In these embodiments, chopping the moving target sequence and creating separate chopper-open and chopper-closed composite images allows the PSF to be determined from the difference between the chopper-open and chopper-closed composite images.

In some embodiments, the temporal phase of the chopper modulation in each frame may be identified using by using an ensemble of the frames. Open, closed, and any in-transition images may also be identified and the identified in-transition images may be discarded. In these embodiments, the phase of the chopper waveform may be used to separate the chopper open and closed frames. In some alternate embodiments, intensity may also be used to separate chopper open and closed frames, although this is not a requirement.

In some embodiments, the position estimates of the individual images may be based on consistency with the composite image (i.e., by calculating fine adjustments to the image shifts). In some embodiments, adjustments to input image pixel biases may be calculated based on agreement with the composite image. In some embodiments, adjustments to the input image pixel relative gains may be calculated via agreement with the composite image. Adjustments to the overall image DC background over time may be calculated via agreement with the composite image.

In some embodiments, global parameter fits to the difference composite surface may be calculated, for example, using Zernike coefficients, to describe an input wavefront convolved with the active area of a pixel. These parameters may be used to calculate the data products 117 at a desired resolution and spacing.

In some embodiments, the image data output 115 generated by the blur-calibration subsystem 152 may be stored for subsequent processing by the data processing subsystem 154. Although system 100, including the blur-calibration subsystem 152 and the data processing subsystem 154, is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of system 100 may refer to one or more processes operating on one or more processing elements.

Figure 3:
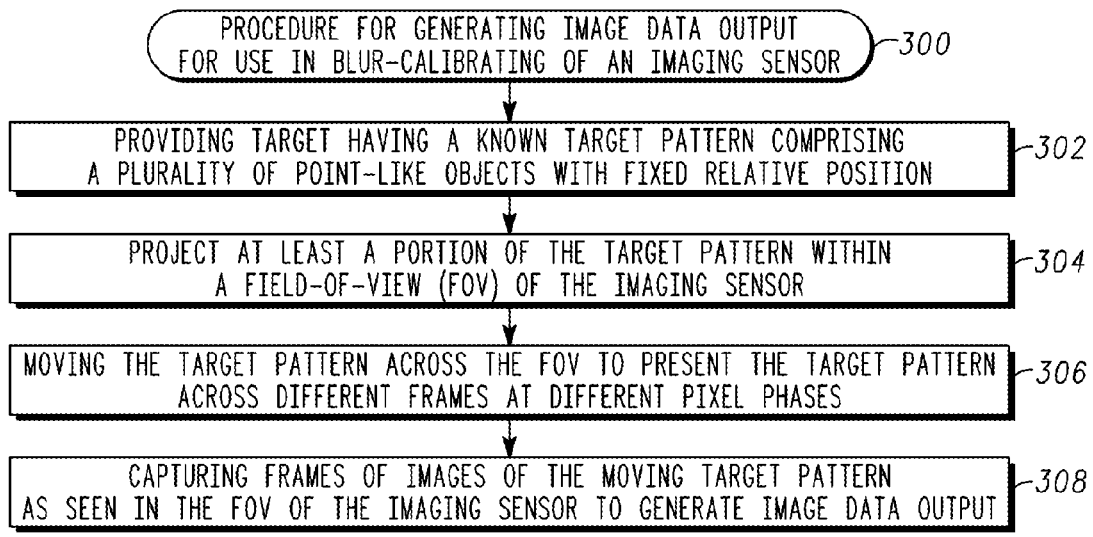
FIG. 3 is a procedure for generating image data output for use in blur-calibration of an imaging sensor in accordance with some embodiments.

FIG. 3 is a procedure for generating image data output for use in blur-calibration of an imaging sensor in accordance with some embodiments. Procedure 300 may be performed by blur-calibration subsystem 152 (FIG. 1), although other subsystems may be configured to perform procedure 300. Procedure 300 may generate image output data for use in blur-calibration of an imaging sensor, such as imaging sensor 150 (FIG. 1) for reducing and possibly eliminating blur at one or more locations in the FOV of the imaging sensor 150.

Operation 302 comprises providing a target having a known target pattern 104 comprising a constellation of point-like objects 103 with fixed relative positions.

Operation 304 comprises projecting at least a portion of the target pattern 104 within the FOV of the imaging sensor 150.

Operation 306 comprises moving the target pattern 104 across the FOV to present the target pattern 104 across different frames at different pixel phases.

Operation 308 comprises capturing frames of images 113 of the moving target pattern 104 as seen in the FOV of the imaging sensor 150 and generating an image data output 115. The image data output may be processed by the data processing subsystem 154 (FIG. 1) or stored for later processing.

Figure 4:
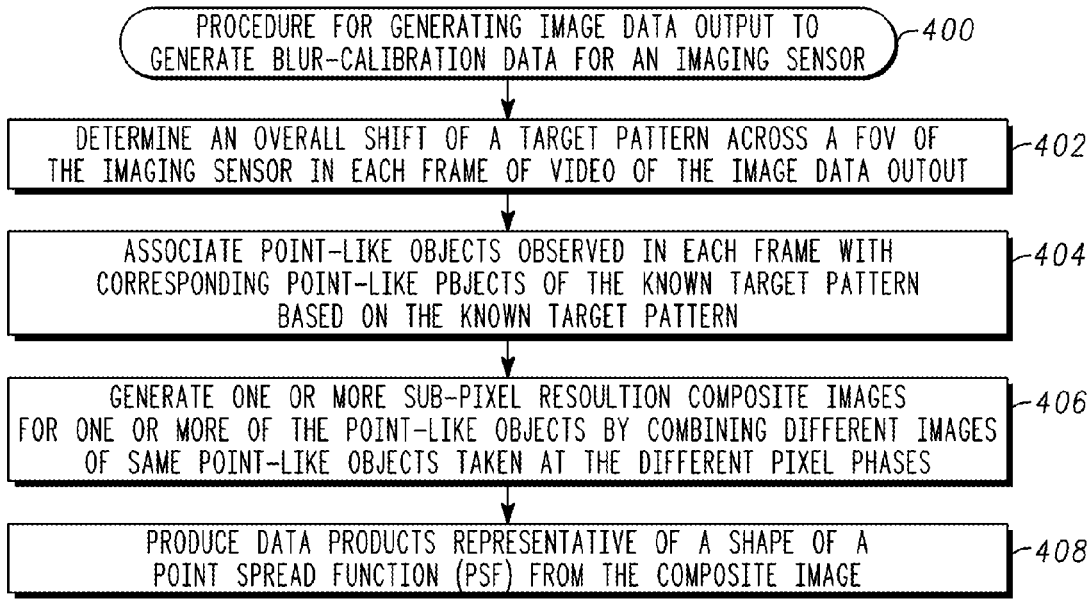
FIG. 4 is a procedure for processing image data output to generate blur-calibration data for imaging sensor in accordance with some embodiments.

FIG. 4 is a procedure for processing image data output to generate blur-calibration data for imaging sensor in accordance with some embodiments. Procedure 400 may be performed by data processing subsystem 154 (FIG. 1), although other subsystems may be configured to perform procedure 400.

Operation 402 comprises determining an overall shift of the target pattern 104 across the FOV in each frame of video of the image data output 115.

Operation 404 comprises associating the point-like objects observed in each frame of video of the image data output 115 with corresponding point-like objects of the known target pattern 104 based on the known target pattern 104.

Operation 406 comprises generating one or more sub-pixel resolution composite images for one or more of the point-like objects 103 by combing different images of same point-like objects taken at the different pixel phases.

Operation 408 comprises producing data products 117 representative of a shape of the PSF from the composite image. In some embodiments, a chopper modulation may be applied to the moving target sequence and separate chopper-open and chopper-closed composite images are created. The PSF may be determined based at least in part on the difference between the chopper-open and chopper-closed composite images. The PSF may specify the shape of blur at one or more locations in the FOV.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, system 100 and particularly data processing element 116 (FIG. 1) may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A system for blur-calibration of an imaging sensor, the system comprising:
    a target having a known target pattern comprising a plurality of point-like objects with fixed relative positions;
    a projection element to project at least a portion of the target pattern within a field-of-view (FOV) of the imaging sensor;
    a controller configured to move the target pattern across the FOV;
    image-capture elements to capture frames of images of the moving target pattern as seen in the FOV of the imaging sensor and generate an image data output, wherein the controller is configured to cause the target pattern to move across the FOV to present the target pattern across different frames at different pixel phases, wherein the image data output from the image-capture elements is subsequently processed to generate data products representative of a shape of a point-spread function (PSF) from a high-resolution composite image generated from the captured frames; and
    a data processing element configured to process the image data output generated from the image-capture elements, wherein the data processing element is configured to:
    determine an overall shift of the target pattern across the FOV in each frame of video of the image data output;
    associate point-like objects observed in each frame of video of the image data output with corresponding point-like objects of the known target pattern based on the known target pattern;
    generate one or more sub-pixel resolution composite images for one or more of the point-like objects by combing different images of same point-like objects taken at the different positions, each sub-pixel resolution composite image being effectively placed within the high-resolution composite image according to a relative position, including full-pixel shift and sub-pixel phase, of the point-like object in that image; and
    produce data products representative of a shape of the PSF from the composite image.

2. The system of claim 1 wherein the system is further configured to utilize a neighborhood of samples to provide error reduction in the high-resolution composite image to create an approximation of a PSF for each point-like object.

3. The system of claim 1 wherein the different pixel phases are different sub-pixel fractional positions of the point-like objects within each frame.

4. A system for blur-calibration of an imaging sensor, the system comprising:
    a target having a known target pattern comprising a plurality of point-like objects with fixed relative positions;
    a projection element to project at least a portion of the target pattern within a field-of-view (FOV) of the imaging sensor;
    a controller configured to move the target pattern across the FOV; and
    image-capture elements to capture frames of images of the moving target pattern as seen in the FOV of the imaging sensor and generate an image data output, wherein the controller is configured to cause the target pattern to move across the FOV to present the target pattern across different frames at different pixel phases, wherein the image data output from the image-capture elements is subsequently processed to generate data products representative of a shape of a point-spread function (PSF) from a high-resolution composite image generated from the captured frames;
    wherein the target pattern is an asymmetric pattern configured to allow an overall position to be determined from a sub-area of the pattern.

5. The system of claim 4 wherein the point-like objects of the target pattern comprise irregularly spaced points having a wider spacing near a center of the pattern and a closer spacing further away from the center for increased phase diversity and coverage.

6. The system of claim 4 wherein the target pattern further comprises a prime number of slits for increased phase diversity, wherein the slits are arranged in a circle.

7. The system of claim 4 the target pattern comprises hexagonal rings of the point-like objects with a decreasing spacing between the rings.

8. The system of claim 1 wherein the system is configured to apply a chopper modulation to the target pattern to modulate intensities of the point-like objects as the target pattern is moved across the FOV.

9. The system of claim 8 further configured to:
    generate composite images of the moving target pattern by separately generating chopper-open and chopper-closed composite images from chopper modulated frames to allow removal of a non-uniform slide background, and
    align the high-resolution composite images of the chopper-open and chopper closed modulated frames and subtracting the aligned frames from each other to remove the effect of the slide background and capture the PSF.

10. The system of claim 9 further configured to:
    identify a temporal phase of the chopper modulation in each frame using by using an ensemble of the frames; and
    identify in-transition frames based on intensity;
    identify the chopper phase over time using the in-transition images;
    identify fully open and closed frames based on the chopper phase; and
    determine the PSF from the difference between the open and closed composite images.

11. A method for generating image data output for use in blur-calibration of an imaging sensor, the method comprising:
    moving a known target pattern across a field-of-view (FOV) of the imaging sensor to present the target pattern across different frames at different pixel phases;
    capturing frames of images of the moving target pattern as seen in the FOV of the imaging sensor to generate image data output, wherein the image data output is to be subsequently processed to generate data products representative of a shape of a point-spread function (PSF) from a high-resolution composite image generated from the captured frames;

projecting at least a portion of the known target pattern within the FOV of the imaging sensor, the known target pattern comprising a plurality of point-like objects with fixed relative positions;

chopping the moving target sequence by applying a chopper modulation; and creating separate chopper-open and chopper-closed composite images, wherein the PSF is determined from the difference between the chopper-open and chopper-closed composite images.

12. A method for processing image data output to generate blur-calibration data for an imaging sensor, the method comprising:

determining an overall shift of a target pattern across a field-of-view (FOV) of the imaging sensor in each frame of the image data output;

associating point-like objects observed in each frame with corresponding point-like objects of the known target pattern based on the known target pattern;

generating one or more sub-pixel resolution composite images for one or more of the point-like objects by combing different images of same point-like objects taken at the different pixel phases, each sub-pixel resolution composite image being effectively placed within the high-resolution composite image according to a relative position, including sub-pixel phase, of the point-like object in that image; and producing data products representative of a shape of a point spread function (PSF) from the composite image.

13. The method of claim 12 wherein prior to generating the image data output, a chopper modulation is applied to the moving target sequence and separate chopper-open and chopper-closed composite images are generated, and wherein the method further includes determining the PSF based at least in part on the difference between the chopper-open and chopper-closed composite images, the PSF specifying a shape of blur at one or more locations in the FOV.

14. The method of claim 12 further comprising utilizing a neighborhood of samples to provide error reduction in the high-resolution composite image to create an approximation of a PSF for each point-like object.

* * * * *

UNITED STATES PATENT AND TRADEMARK OFFICE
CERTIFICATE OF CORRECTION

| | | |
|---|---|---|
| PATENT NO. | : 8,665,334 B2 | Page 1 of 1 |
| APPLICATION NO. | : 13/214683 | |
| DATED | : March 4, 2014 | |
| INVENTOR(S) | : Darin Williams | |

It is certified that error appears in the above-identified patent and that said Letters Patent is hereby corrected as shown below:

On the title page, item (57), in "Abstract", in column 2, line 5, delete "field-of view" and insert --field-of-view--, therefor In the Specification Column 2, line 43, delete "(OUT))." and insert --(UUT)).--, therefor Column 3, line 62, after "of", delete "e", therefor Column 4, line 1, delete "system" and insert --subsystem--, therefor Column 5, line 38, before "by", delete "using", therefor In the Claims Column 8, line 46, in Claim 10, before "by", delete "using", therefor Signed and Sealed this
Eighteenth Day of November, 2014

Michelle K. Lee
*Deputy Director of the United States Patent and Trademark Office*